March 4, 1941.        R. H. PARK        2,233,485
ELECTRIC COOKING DEVICE
Filed Sept. 29, 1938        4 Sheets-Sheet 1

Inventor:
Robert H. Park,
by Emery, Booth, Townsend, Miller & Weidner
Attys

March 4, 1941.  R. H. PARK  2,233,485
ELECTRIC COOKING DEVICE
Filed Sept. 29, 1938   4 Sheets-Sheet 2

Inventor:
Robert H. Park,

March 4, 1941. R. H. PARK 2,233,485
ELECTRIC COOKING DEVICE
Filed Sept. 29, 1938 4 Sheets-Sheet 3
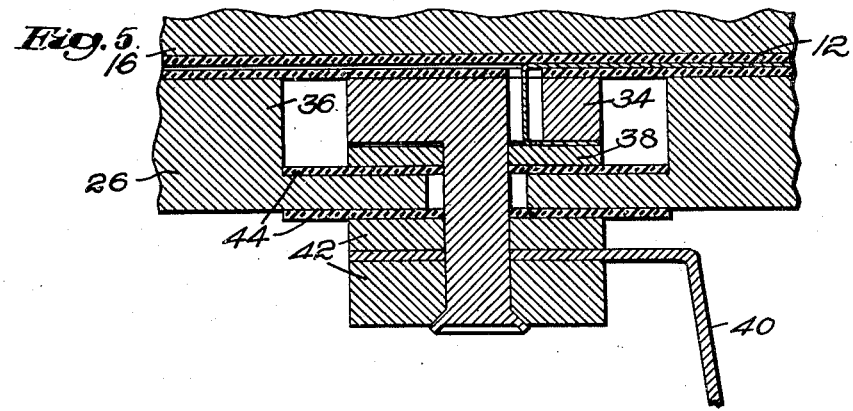
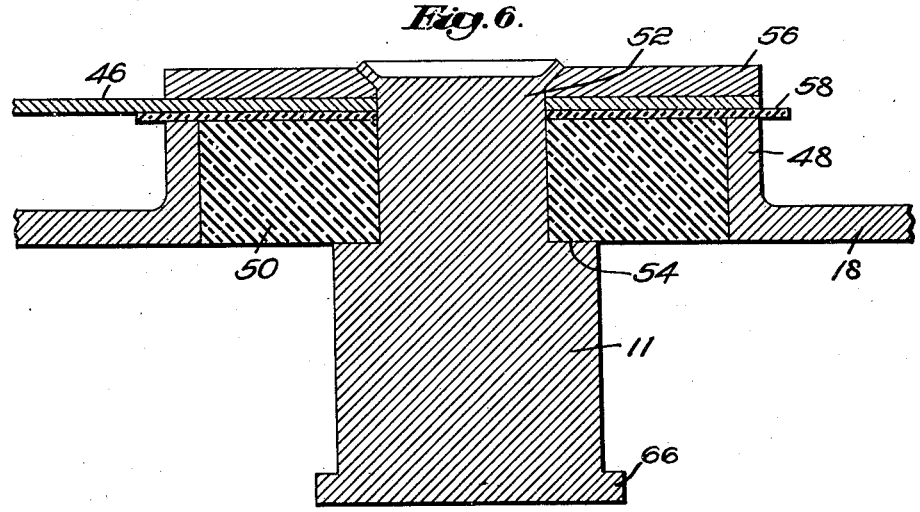
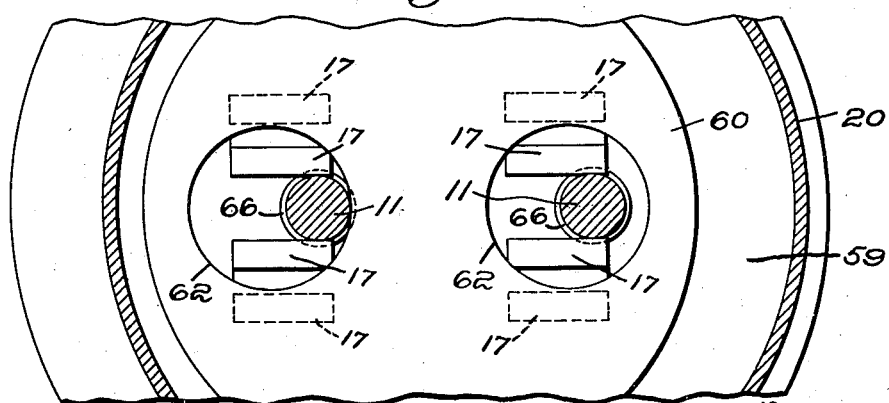
Inventor:
Robert H. Park,
by Emery, Booth, Townsend, Miller & Weidner
Attys March 4, 1941.    R. H. PARK    2,233,485
ELECTRIC COOKING DEVICE
Filed Sept. 29, 1938    4 Sheets-Sheet 4

Inventor:
Robert H. Park,
by Emery, Booth, Townsend, Miller & Widner
Attys

Patented Mar. 4, 1941

2,233,485

UNITED STATES PATENT OFFICE 2,233,485

ELECTRIC COOKING DEVICE

Robert H. Park, Pluckemin, N. J.

Application September 29, 1938, Serial No. 232,369

14 Claims. (Cl. 219—43)

This invention relates to electric cooking and the object is to provide an improved cooking vessel having a self-contained heating element and coordinately therewith improvements both in the mechanical and electrical construction of the "stove" with which it is used.

My invention will be well understood by reference to the following description of the illustrative embodiment thereof shown by way of example in the accompanying drawings, wherein—

Fig. 1 is a vertical transverse section of a saucepan constructed in accordance with my invention positioned on the top of a stove, only a portion of the latter being shown;

Figs. 2 and 3 are sections on the lines 2—2 and 3—3 of Fig. 1 respectively;

Fig. 5 is a fragmentary section on a greatly enlarged scale showing the connection to the heating elements proper;

Fig. 6 is a fragmentary enlarged section illustrating the connection to the vessel of the terminal studs by means of which the heating elements are connected to a source of current;

Fig. 7 is a horizontal section on the line 7—7 of Fig. 1; and

Figure 1:
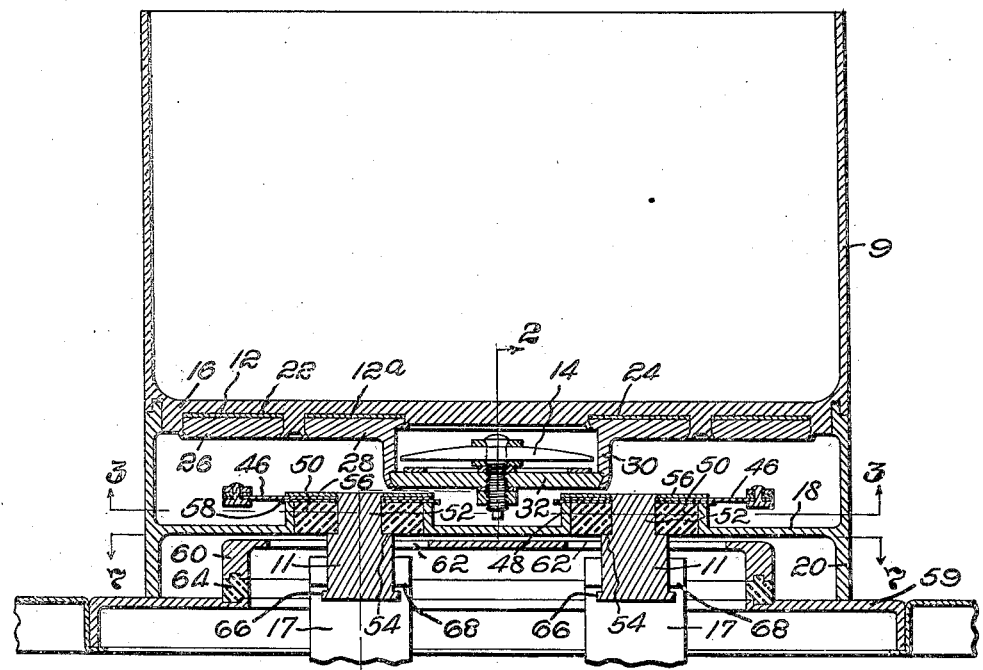

As contrasted with the customary electric cooking apparatus wherein heat is radiated from a resistance element to the vessel containing material to be cooked, a method inefficient for boiling or like operations, the apparatus which I am about to describe makes use of a vessel having a self-contained heating element in efficient thermal conducting relation to the wall of the vessel and adapted efficiently to supply heat by conduction to the contents thereof.

Many features of construction herein disclosed are substantially like those shown in my prior Patents 2,012,618 and 2,045,673 and therefore will require only brief description herein. In contrast with the specific disclosures of those patents, the cooking apparatus herein shown is adapted to be operated directly from the ordinary 110 volt current-supply lines usually found in residences without the use of a step-down transformer.

I have herein shown a cooking vessel 9 of the saucepan type having projecting downwardly from its bottom terminal studs 11 through which current is supplied to the heating elements hereinafter more fully to be described, which studs are adapted to enter between and be grasped by pairs of jaws 17 through which the current is supplied. As indicated by the partial illustration in Figs. 2 and 8, these jaws may be mechanically operated and electrically governed as in my aforesaid Patent 2,045,673, to which reference is made for a fuller illustration, each pair being herein pivoted together on a pivot 23 and having a normally open position to permit the introduction of the studs 11 between the same, and they are adapted to be swung to clamping position against the studs by the operation of a reversible electric motor 45, the arrangement being such that the jaws are completely closed before current is supplied thereto and conversely current is cut off before the jaws open. Without repeating in extenso the description given in the prior patent referred to, control of the cooking operation is effected by means of the hand-operated switch 71 (Fig. 8) of the double-pole, double-throw type shown in the off position in that figure wherein all the parts are in the position they would assume when the stove was not in use. The pan is placed in position by a simple movement of superposition with the studs 11 extending between the open jaws, and when the switch 71 is thrown, motor 45 is energized which results in the mechanical closing of the switch 65, a mechanical advance of the clamping jaws to closed position by turning of the shaft 31 which has right and left threads engaging respectively the jaws of a pair, and ultimately a movement of switch 55 which both breaks the motor energizing circuit and also closes the circuit of solenoid 91, lifting bridge 95 and causing current to flow to the clamps. After the cooking is completed, when the main switch 71 is shifted back to the position shown in the drawings, the movement of bridge 85 of the switch breaks the circuit of solenoid coil 91 and thus opens the heating circuit. Further it reenergizes the motor to cause its rotation in the reverse direction which in turn first provides for return of switch 55 to the position illustrated under the action of spring 53 and then cause rotation of shaft 31 in a direction to open the clamps.

Figure 8:
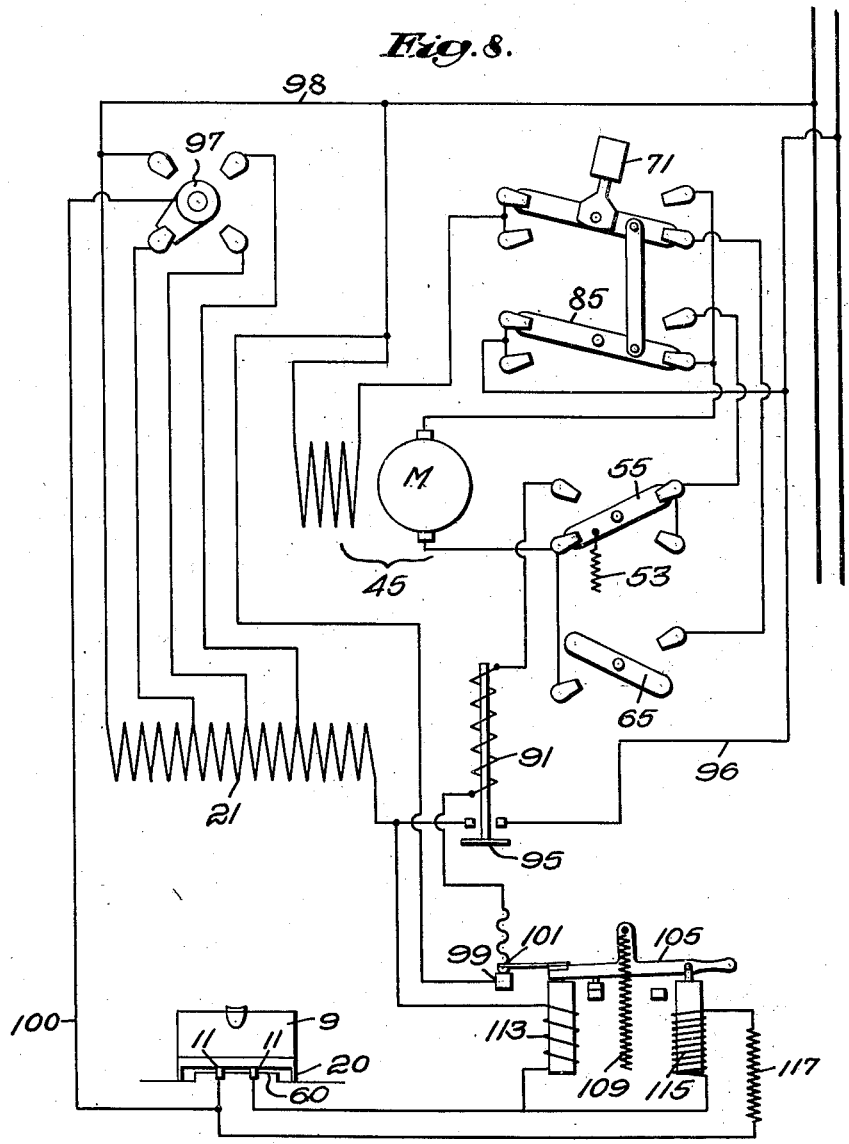
Fig. 8 is a wiring diagram.

The heating current is supplied through conductor 98 and under control of the selector switch 97 governing the auto-transformer 21 through wire 100 to the left-hand stud 11 illustrated in Fig. 8 and from the right-hand stud leads through the coil 113, hereinafter to be referred to, and through the bridge 95 and wire 96 to the opposite side of the line. The voltage applied and the intensity of the heat are regulated by manipulation of the switch 97.

Further to describe the electrical features illustrated in Fig. 8, I have there shown a safety mechanism substantially similar to that shown in my Patent 2,070,491 responsive to a change in the impedance of the cooking vessel, herein effected in a manner hereinafter more fully to be described, to interrupt the circuit when the vessel cooks dry and thus prevent objectionable burning on of semi-liquid matter or destruction of the vessel by melting. This mechanism comprises a switch in the circuit of solenoid 91 having a fixed contact 99 with which cooperates a spring blade 101 carried by a rocking beam 105 normally held closed by a spring 109. Opposite ends of the beam are here shown as connected to the coils 113 and 115 respectively. The coil 113 is arranged in series in the heating circuit as already described and is so wound as to attract its core with a force which is a function of the current (amperage). Coil 115 is of high resistance and may be bridged across the studs 11, conveniently with the addition of a resistor 117, and acts on its core with a force which is a function of the electro-motive force or voltage. When the impedance of the pan circuit substantially changes (increases in this particular instance), the force of coil 115 overcomes the force of coil 113, rocking beam 105 clockwise, opening the circuit of solenoid 91, which in turn shifts bridge 95 from its contacts and opens the heating circuit, which remains open until the switch is manually reclosed.

Figure 4:
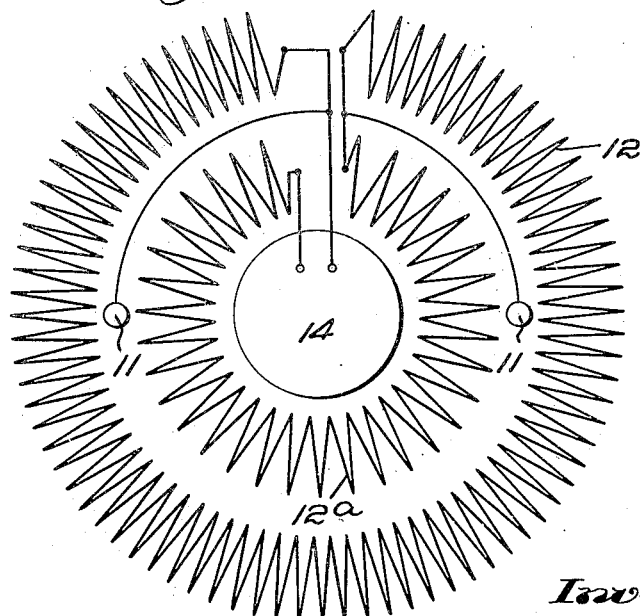
Fig. 4 is a wiring diagram of the heating elements incorporated in the cooking vessel.

To provide a cooking vessel having an inbuilt heating element adapted to operate on ordinary house current while providing a mechanical construction of adequate simplicity and sufficient lightness of weight, I utilize by means of the novel features of construction hereinafter described resistance elements of nickel-chromium alloy commonly known commercially as Nichrome. Such material has a low temperature coefficient. To permit the effective operation of the safety control just described, therefore, I preferably utilize (see Fig. 4) two heating elements 12 and 12a arranged in parallel, one being under control of a thermostat 14, which may be of the snapping disc type described in principle in United States Patents 1,448,240 and 1,718,716 and unnecessary to illustrate in detail. Commercial forms of such thermostats are well known on the market. If the pan boils dry and begins to heat unduly, the thermostat operates to cut element 12a out of the circuit, thereby markedly increasing the impedance of the vessel and causing the operation of the switch at 99—101.

The arrangement just described is particularly advantageous since the operation of the safety device depends only on temperature substantially independently of the rate of heat application. Due to the low temperature coefficient of the resistance elements employed, their resistance does not substantially vary with rate of heat application. If, on the contrary, there were a tendency for an increase in resistance with rate of heat application, it would be necessary to set the safety device for a relatively high value of resistance which would mean that at low rates of heat input (low applied voltage) it would not operate until a relatively high pan temperature has been attained. This difficulty is avoided with the arrangement shown.

Referring now to the mechanical features of construction of the vessel 9 illustrated, I have herein shown it as comprising a cup-like body having an inner bottom 16 which supports the contents of the same and an outer bottom 18 defining with the inner bottom a water-tight intervening chamber and from which outer bottom project downwardly the terminal studs 11. A depending marginal flange 20 permits the vessel to be set on a horizontal surface without interference from the studs 11.

The resistance elements proper 12 and 12a may be of more or less conventional construction consisting of a suitable wire wound on a sheet of mica and located between two mica sheets, and I have considered it unnecessary to illustrate these in detail. To provide for efficient thermal contact of these resistance elements with the bottom 16 of the pan without bulky or unduly heavy parts, I may provide the grooves 22 and 24 in the under side of the bottom of the pan, these grooves preferably being of annular form which, besides providing for good thermal distribution, permits them to be simply cut by a suitable tool in a single rotary cut. The resistance elements 12 and 12a are of like annular form and are received in these grooves and firmly pressed against the bottom 16 by means of annular pressure plates 26 and 28 respectively, which fit in the grooves and are securely and firmly held by upsetting the material of the bottom at the sides of the groove over the margins of these plates, as clearly illustrated in Fig. 1. Because of the annular construction, these plates are of relatively restricted width, providing for a uniform pressure on the overlying resistance elements. I have herein shown the inner pressure plate 28 as provided with a depending cylindrical flange 30 defining a chamber for receiving the thermostat 14 which is here mounted on a cover 32 closing the under side of this chamber and retained in position by rolling over the margin of the flange 30.

Figure 3:
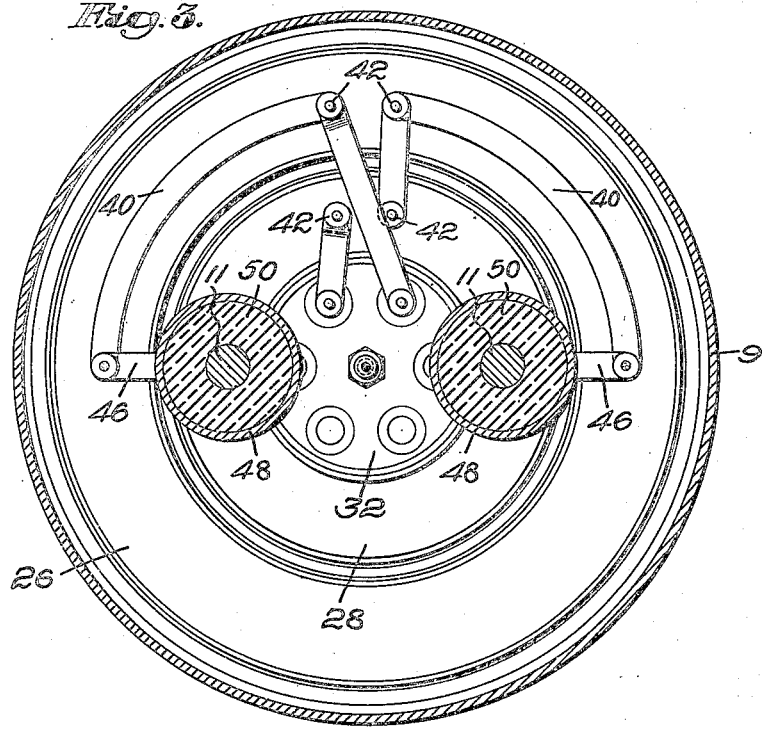

The pressure plates 26 and 28 also may support suitable studs by means of which current is supplied through suitable conductors to the resistance elements, as best illustrated in Fig. 5 in connection with the resistance element 12. A rivet-like member 34 has a shank passing through the plate 26 with suitable clearance as shown and a head received in a recess 36 therein. The end of the resistance element 12 may extend through a hole in the head and be interposed between the lower face of this head and a washer 38 surrounding the shank. Conductor 40 is received between washers 42 at the outer end of the shank, suitable insulating washers 44 being provided to insulate the washers 38 and 42 from the pressure plate 26, and the upsetting of the shank of the stud on washers 42 binds all the elements firmly together. The conductors 40 lead through the chamber between the bottoms (Fig. 3) to connecting arms 46 carried on the studs 11.

The method of mounting and connecting the studs 11 will be best understood from Fig. 6. It will be understood that in a device for this purpose a smooth exterior surface is desired capable of being kept clean and that the connection must be air-tight and capable of considerable abuse. The construction which I am about to describe is as a matter of fact capable of withstanding a sidewise thrust on the studs 11 of at least one hundred pounds. As seen in Fig. 6, the relatively thin lower bottom 18 of the vessel is provided with apertures of relatively great size as compared with the diameter of the studs, which apertures have extending upwardly therefrom deep flanges 48. Received and supported by these flanges are massive blocks 50 of suitable insulating material which may be a compound of mica and borax, commonly known commercially as Micalex. Preferably I make these blocks slightly larger than the opening in which they are to be received and shrink the flanges 48 thereabout to insure a positive fit which will not loosen when the pan is heated. The studs 11 are carried by these blocks 50 and they are herein shown as provided with reduced shanks 52 defining shoulders 54 which seat on the lower faces of the blocks flush with the bottom 18 of the pan. The shanks extending through the blocks may be riveted over washers 56, drawing shoulders 54 in firm water-tight engagement with the blocks. The conducting arm 46 is secured in the joint between the washer and the block, a suitable insulating washer 58 of mica or the like separating it from the upper end of the flange 48. The washers 56 overhang the ends of flanges 48 and therefore if under excess heat (as when the pan boils dry) the shrink joint of these flanges should loosen, the blocks cannot fall out but the original tightness of the joint will be restored when normal temperature conditions are restored.

Figure 2:
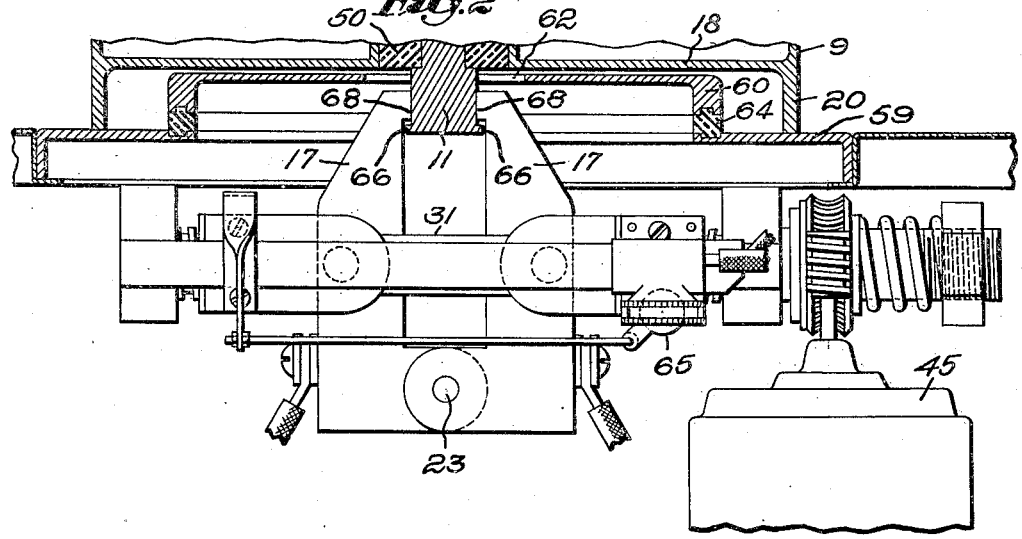

Referring now more particularly to Figs. 2 and 7, the mechanism with which the pan is used will be organized as a unit or stove, and for obvious reasons the stove will have a more or less continuous top covering over the mechanical and electrical parts illustrated, for instance, in Fig. 2. For facility in cleaning the top should be smooth without grooves or small projections. Herein it comprises a main flat portion 59 on which the flange 20 of the vessel may rest. Since this flange extends below the studs 11, the jaws 17 project above the level of the portion 59 and a cover plate 60 of generally inverted cup-shaped form is provided to overlie the jaws 17, this plate having openings 62 through which the studs may extend. It will be noted that this cover plate as such and the flange 20 have nothing to do with the positioning of the vessel and the plate may therefore be made of minimum size to enter within the ambit of the flange of a small vessel, or alternatively a larger vessel with a peripheral flange of larger diameter may be placed thereover. While the openings 62 are of such size as to freely pass the studs, their margins may serve as guiding means to facilitate entry of the studs between the jaws in the open position of the latter, as indicated in dotted lines in Fig. 7. The cover plate 60 is herein shown as supported by insulating material 60 to prevent the possibility of short circuits to ground or across the line in case two or more utensils are simultaneously being heated on similar stations of a complete stove. The size and disposition of the openings 62 are so designed that when the vessel is in position between the closed jaws 17 (and it will be recalled that current can flow only when the jaws are closed) both studs cannot simultaneously be in contact with the plate 60 to permit a short circuit through the plate. Thus, referring to Fig. 7, the elements of the respective pairs of jaws close inwardly on the studs from opposite sides of the line connecting them, being a horizontal line in Fig. 7. The openings 62 are of such size that the homologous portions thereof, for instance, the parts in the three o'clock position of Fig. 7 of the drawings are spaced in a direction parallel to that line for a distance greater than the corresponding homologous portions of the studs so that, as illustrated in Fig. 7, while the left-hand stud may make contact with the left-hand opening 62 at the three o'clock position, there is a clearance between the corresponding points of the right-hand stud and opening so that no short circuit through the cover plate 60 is possible.

Preferably, as best seen in Figs. 2 and 7, the studs 11 have flanges at their lower ends providing abrupt, upwardly facing shoulders 66 and the engaging portions of the jaws, which have corresponding downwardly facing, abrupt shoulders 68, clasp the vertical sides of the studs above these flanges and overlie the same to provide a positive interlock against withdrawal of the studs from between the closed jaws. If it is attempted to remove the vessel without opening the jaws, no loosening strain is placed upon the latter since the shoulders 66 and 68 engage in a horizontal plane.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A cooking vessel having incorporated within the wall thereof a heating element completely and inaccessibly encased by such wall except for terminals projecting from said wall and exposed at the exterior of the vessel for including the heating element in an electric circuit, the heating element comprising a pair of parallel resistance elements in thermal contact with but electrically insulated from the wall, and a thermostat exposed to the direct radiated heat of the vessel wall and adapted to cut out one only of the resistance elements when the temperature of the wall adjacent thereto increases above a determined temperature, as when the vessel boils dry, whereby to increase the impedance of the circuit for operating a safety device therein, and to cut the resistance element back into the circuit when the temperature thereafter falls below another determined value.

2. In an electric cooking device in combination with a cooking vessel having within a wall thereof an electrical heating element in thermal contact but electrically insulated therefrom having terminals exposed at the exterior of the vessel for including the same in an electric circuit, the element embodying means effective temporarily substantially to change the impedance thereof when the temperature of the vessel wall adjacent thereto increases above a determined value, as when the vessel boils dry, means for connecting the same through said terminals to a source of electric energy, means for controlling in substantial degree the voltage supplied to the circuit whereby to control the rate of heat supply to the vessel, a switch controlling the supply of energy to the circuit, differentially acting means controlling said switch comprising an electro-magnetic motor device responsive to the voltage and an electro-magnetic motor device in a different magnetic circuit responsive to the current whereby to open the switch on abnormal increase of impedance in the vessel.

3. In an electric cooking device in combination with a cooking vessel having within a wall thereof an electrical heating element comprising a pair of parallel resistance elements in thermal contact with but electrically insulated from said wall and having terminals exposed at the exterior of the vessel for including the heating element in an electric circuit, the heating element comprising a temperature responsive means adapted to cut out one only of the resistance elements when the temperature of the vessel wall adjacent thereto increases above a determined value, as when the vessel boils dry, means for connecting the same in an electric circuit to a source of electrical energy, the said circuit exterior of the vessel comprising a manual control switch and an electrically operated switch responsive to such change of vessel impedance to open the circuit.

4. In an electric cooking device in combination with a cooking vessel having within a wall thereof an electrical heating element in thermal contact but electrically insulated therefrom having terminals exposed at the exterior of the vessel for including the same in an electric circuit, the element embodying means effective temporarily substantially to change the impedance thereof when the temperature of the vessel wall adjacent thereto increases above a determined value, as when the vessel boils dry, means for connecting the same in an electric circuit to a source of electrical energy, the said circuit exterior of the vessel comprising a manual control switch and an electrically operated switch responsive to such change of vessel impedance to open the circuit.

5. An electric cooking vessel having a self-contained heating element and having a bottom exteriorly uniform to permit the effective wiping traverse of a cleaning cloth or the like over the same, said bottom having openings therethrough bounded by inwardly extending flanges, massive blocks of insulating material fitted within the flanges and terminating substantially flush with said bottom, the flanges being normally stressed in tight gripping relation to the blocks to retain the latter as such and to provide an impervious joint, and imperforate terminal studs for the heating element having impermeable connection with and supported by the blocks in spaced relation to the flanges and projecting below the bottom.

6. An electric cooking vessel having a self-contained heating element and having a bottom exteriorly uniform to permit the effective wiping traverse of a cleaning cloth or the like over the same, said bottom having openings therethrough bounded by inwardly extending flanges, massive blocks of insulating material fitted within the flanges and terminating substantially flush with said bottom, the flanges being normally stressed in tight gripping relation to the blocks to retain the latter as such and to provide an impervious joint, and imperforate terminal studs for the heating element projecting below the bottom having shoulders resting on the blocks and integral shanks extending through the same, the shoulders making an impermeable joint with the lower faces of the blocks and the shanks supporting the studs in spaced relation to the flanges.

7. An electric cooking vessel having a self-contained heating element and having a bottom exteriorly uniform to permit the effective wiping traverse of a cleaning cloth or the like over the same, said bottom having openings therethrough bounded by inwardly extending flanges, massive blocks of insulating material fitted within the flanges and terminating substantially flush with said bottom, the flanges being normally stressed in tight gripping relation to the blocks to retain the latter as such and to provide an impervious joint, washers opposing the inner ends of the flanges, and terminal studs for the heating element projecting below the bottom of the vessel having shoulders pressed against the lower faces of the blocks in spaced relation to the flanges to form an impermeable joint and shanks extending through the blocks and engaged with said washers.

8. An electric cooking vessel having a double bottom, the inner bottom, which in use supports the contents of the vessel, having a resistance element supported in firm thermal conducting contact with the underside thereof, the outer bottom being exteriorly uniform to permit the effective wiping traverse of a cleaning cloth or the like over the same and having openings therethrough bounded by inwardly extending flanges, massive blocks of insulating material fitted within the flanges and terminating substantially flush with said bottom, the flanges being normally stressed in tight gripping relation to the blocks to retain the latter as such and to provide an impervious joint, solid terminal studs for the heating element having impermeable connection with and supported by the blocks in spaced relation to the flanges and projecting below the bottom, and connections between said studs and element received between the bottoms.

9. An electric cooking vessel having a double bottom, the inner bottom, which in use supports the contents of the vessel, having a resistance element supported in firm thermal conducting contact with the underside thereof, the outer bottom being exteriorly uniform to permit the effective wiping traverse of a cleaning cloth or the like over the same and having openings therethrough, massive blocks of insulating material carried by the outer bottom and providing an impervious closure for said openings substantially flush with said bottom, solid terminal studs for the heating element having impermeable connection with and mounted in said blocks in spaced relation to the margins of the opening, said studs projecting below the outer bottom, and connections between said studs and element received between the bottoms.

10. Electric cooking equipment, in combination with a vessel having a self-contained heating element and terminal studs therefor projecting downward below the bottom of the vessel, a current supplying system having pairs of jaws between which the studs are received, a support for receiving the bottom of the vessel having openings through which the studs may project vertically to be engaged by said jaws, the size and location of the openings in a horizontal plane being such that in any position wherein the studs are so engaged only one thereof may be in contact with the support at the margins of the openings.

11. Electric cooking equipment, in combination with a vessel having a self-contained heating element and terminal studs therefor projecting downward below the bottom of the vessel, a current supplying system having pairs of jaws between which the studs are received and adapted to close thereon from opposite sides of a line connecting the studs, a support for receiving the bottom of the vessel having openings through which the studs may project vertically downward to be engaged by the jaws, the distance measured parallel to said line between homologous portions of the margins of the opening being greater than the distance between homologous portions of the studs whereby the studs cannot simultaneously contact margins of the openings on displacement of the vessel along said line.

12. In electric cooking equipment, in combination, a vessel having a self-contained heating element and terminal studs therefor depending from the bottom of the vessel, a current supplying system having pairs of relatively movable jaws having an open position permitting the studs to be freely placed between the jaws with clearance therefrom and a closed position grasping the studs, means for operating the jaws, an insulated cover plate overlying the jaws and having openings of substantially greater size than the studs through which they may be inserted and the margins of which are located to guide the studs between the opened jaws, said margins being differentially positioned relatively to the peripheries of the studs to exclude simultaneous contact of the studs therewith when the jaws are closed.

13. In electric cooking equipment in combination with a vessel having a self-contained heating element, depending supporting means adjacent the periphery thereof on which the vessel may stand, and terminal studs depending from the bottom of the vessel within the ambit of the supporting means, a current supplying system having a smooth top on which the supporting means may rest and a relatively small insulated cover plate to project upwardly within the ambit of the same having openings therethrough through which the studs may loosely extend, and pairs of jaws connected respectively to opposite sides of a source of current located beneath the openings and having an open position permitting the studs as guided by margins of said openings to be freely entered between the same with clearance therefrom and a closed position grasping the studs.

14. In electric cooking equipment, in combination, a vessel having a self-contained heating element, terminal studs depending from the bottom thereof having flanges defining abrupt, upwardly facing shoulders, a current supplying system having pairs of relatively movable jaws having an open position permitting the studs to be freely placed between the jaws with clearance therefrom and a closed position wherein engaging portions of the jaws overlie the flanges to provide a positive interlock against withdrawal of the studs and clasp the studs above the flanges and means for operating the jaws.

ROBERT H. PARK.